US008280036B2

(12) United States Patent
Cendrillon et al.

(10) Patent No.: US 8,280,036 B2
(45) Date of Patent: Oct. 2, 2012

(54) CONFIGURING THE VIRTUAL NOISE PARAMETERS OF A DIGITAL SUBSCRIBER LINE

(75) Inventors: Raphael Jean Cendrillon, Hong Kong (CN); Guozhu Long, Fremont, CA (US); Dong Wei, Austin, TX (US)

(73) Assignee: Futurewei Technologies, Plano, TX (US)

( * ) Notice: Subject to any disclaimer, the term of this patent is extended or adjusted under 35 U.S.C. 154(b) by 381 days.

(21) Appl. No.: 12/637,885

(22) Filed: Dec. 15, 2009

(65) Prior Publication Data

US 2010/0254442 A1 Oct. 7, 2010

Related U.S. Application Data

(60) Provisional application No. 61/167,006, filed on Apr. 6, 2009.

(51) Int. Cl.
*H04M 9/08* (2006.01)

(52) U.S. Cl. .................................. 379/406.06; 375/220

(58) Field of Classification Search ............... 379/22.08, 379/406.06, 220, 222, 227, 254, 278, 285, 379/296, 346, 367, 382.01
See application file for complete search history.

(56) References Cited

U.S. PATENT DOCUMENTS

2003/0123560 A1* 7/2003 Jacobsen et al. .............. 375/260
2008/0031313 A1* 2/2008 Oksman ........................ 375/222
2009/0073868 A1* 3/2009 Guenach et al. .............. 370/201
2010/0014645 A1* 1/2010 Feng et al. ................. 379/27.01
2011/0206101 A1* 8/2011 Matza et al. .................. 375/222

OTHER PUBLICATIONS

"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)," ITU-T G.992.5, (Jan. 2009).

"Series G: Transmission Systems and Media, Digital Systems and Networks—Digital Sections and Digital Line System—Access Networks—Very High Speed Digital Subscriber Line Transceivers," ITU-T G.993.2, (Feb. 2006).

"Series G: Transmission Systems and Media, Digital Systems and Networks—Digital Sections and Digital Line System—Access Networks—Physical Layer Management for Digital Subscriber Line (DSL) Transceivers," ITU-T G.997.1, (Jun. 1999).

"Transmission and Multiplexing (TM); Access Transmission Systems on Metallic Access Cables; Very High Speed Digital Subscriber Line (VDSL); Part 1: Functional Requirements," ETSI TS 101 270-1 v1.3.1, Technical Specification (Jul. 2003).

American National Standard T1.424-2004, "Interface Between Networks and Customer Installation Very High Speed Digital Subscriber Lines (VDSL) Metallic Interface (DMT Based)," ATIS T1E1.4, Jun. 2004.

* cited by examiner

*Primary Examiner* — Md S Elahee
*Assistant Examiner* — Akelaw Teshale
(74) *Attorney, Agent, or Firm* — Conley Rose, P.C.; Grant Rudolph; Clint Wilkins

(57) ABSTRACT

An apparatus comprising a digital subscriber line (DSL) transmitter configured to transmit a transmitter referred virtual noise for a tone in a subscriber line, wherein the transmitter referred virtual noise is based on a time history of a noise condition in the subscriber line. Also disclosed is an apparatus comprising at least one processor configured to implement a method comprising obtaining a transmitter referred virtual noise for a DSL tone using a plurality of noise condition measurements, and determining a DSL bitloading using the transmitter referred virtual noise.

19 Claims, 8 Drawing Sheets

CONFIGURING THE VIRTUAL NOISE PARAMETERS OF A DIGITAL SUBSCRIBER LINE

CROSS-REFERENCE TO RELATED APPLICATIONS

The present application claims priority to U.S. Provisional Patent Application No. 61/167,006 filed Apr. 6, 2009 by Raphael Jean Cendrillon, et al. and entitled, "Configuring Virtual Noise Parameters of a Digital Subscriber Line," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide relatively large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk limits the performance of some DSL technologies, such as asymmetric DSL 2 (ADSL2) and very high bit rate DSL 2 (VDSL2). For example, significant levels of crosstalk can occur because of the relatively high frequencies used in VDSL2. The crosstalk is highly non-stationary and varies dramatically as lines within the binder are activated and deactivated. Such rapidly varying noise environment causes frequent re-initializations of the lines, loss of service, and low customer satisfaction.

One method for increasing the stability of digital subscriber lines is using virtual noise, a technique that limits the maximum bitloading allowed on each tone. Virtual noise is used to improve DSL stability by ensuring operation of a line at a bitloading level that can be sustained when worse noise conditions are encountered. The performance of a DSL is substantially dependent on the virtual noise configuration for the line. For example, if the virtual noise is set too low, the line becomes unstable. Alternatively, if the virtual noise is set too high, the line's data-rate is unnecessarily reduced. Finding an appropriate configuration for the virtual noise can be difficult due to a variety of practical issues, such as difficulties in line noise data collection, limitations on the number of line profiles in DSL access multiplexers (DSLAMs), finding appropriate balance between line stability and data-rate, and adaptability to changes in the noise environment.

SUMMARY

In one embodiment, the disclosure includes an apparatus comprising a DSL transmitter configured to transmit a transmitter referred virtual noise for a tone in a subscriber line, wherein the transmitter referred virtual noise is based on a time history of a noise condition in the subscriber line.

In another embodiment, the disclosure includes an apparatus comprising at least one processor configured to implement a method comprising obtaining a transmitter referred virtual noise for a DSL tone using a plurality of noise condition measurements, and determining a DSL bitloading using the transmitter referred virtual noise.

In yet another embodiment, the disclosure includes a method comprising defining a plurality of virtual noise templates for a plurality of subscriber lines, calculating a transmitter referred virtual noise for a tone in one of the subscriber lines based on a time history of noise conditions in the subscriber line, and selecting from the defined virtual noise templates a virtual noise template that best matches the transmitter referred virtual noise for the subscriber line.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for configuring virtual noise in DSL systems to improve line stability and limit abrupt changes in line data-rate. Specifically, a transmitter referred virtual noise for a tone in the line may be calculated based on a standard operating signal to noise ratio (SNR) margin, a minimum SNR margin required to ensure line stability, and a transmitter referred line noise for a point in time. The virtual noise may be configured based on a history of the line noise condition using a plurality of time samples or measurements of the line noise condition. To protect against the worst case noise condition over a time period, the transmitter referred virtual noise may be calculated based on a maximum transmitter referred line noise over that time. Alternatively, the transmitter referred virtual noise may be calculated based on a mean of the transmitter referred line noise and a standard deviation of the transmitter referred line noise if a better balance between line stability and line data-rate is desired. In another alternative embodiment, the transmitter referred virtual noise may be adjusted to adapt faster to line noise condition based on a last recent time sample of the of the line noise condition. Additionally, a quantity of virtual noise templates may be defined to configure a larger quantity of subscriber lines in the system. The quantity of the virtual noise templates may be limited by the quantity of supported line profiles in the system. Hence, a virtual noise template that best matches the transmitter referred virtual noise in the line may be selected from the set of virtual noise templates.

Figure 1:
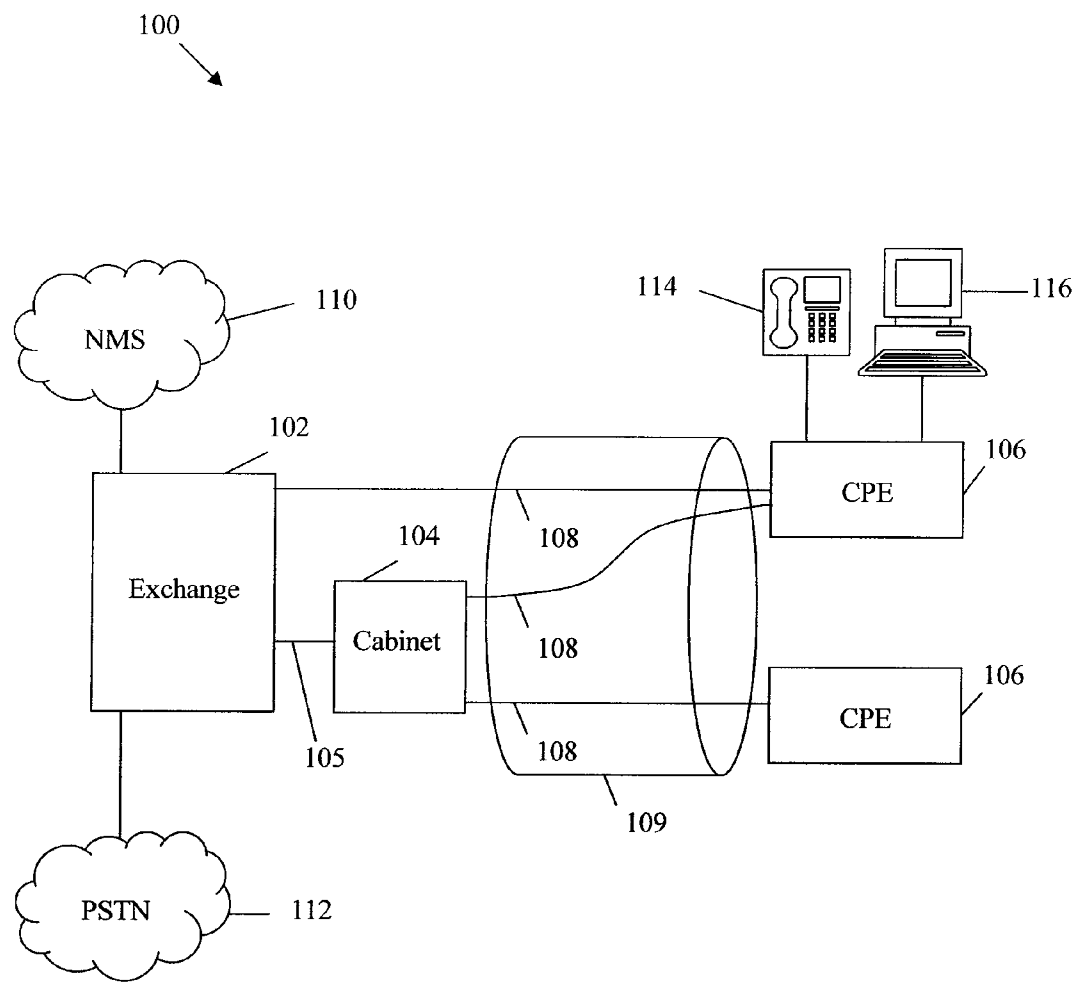
FIG. 1 is a schematic diagram of an embodiment of a DSL system.

FIG. 1 illustrates one embodiment of a DSL system 100. The DSL system 100 may be a VDSL2 system, an ADSL2 system, an ADSL2 plus (ADSL2+) system, or any other DSL system. The DSL system 100 may comprise an Exchange 102, optionally a Cabinet 104 coupled to the Exchange 102 by a cable 105, and a plurality of customer premise equipments (CPEs) 106, which may be coupled to the Exchange 102 and/or the Cabinet 104 via a plurality of subscriber lines 108. At least some of the subscriber lines 108 may be bundled in a binder 109. Additionally, the DSL system 100 may optionally comprise a network management system (NMS) 110 and a public switched telephone network (PSTN) 112, both of which may be coupled to the Exchange 102. In other embodiments, the DSL system 100 may be modified to include splitters, filters, management entities, and various other hardware, software, and functionality.

The NMS 110 may be a network management infrastructure that processes data exchanged with the Exchange 102 and may be coupled to one or more broadband networks, such as the Internet. The PSTN 112 may be a network that generates, processes, and receives voice or other voice-band signals. In an embodiment, the Exchange 102 may be a server located at a central office and may comprise switches and/or splitters, which may couple the NMS 110, the PSTN 112, and the subscriber lines 108. For instance, the splitter may be a 2:1 coupler that forwards data signals received from the subscriber lines 108 to the NMS 110 and the PSTN 112, and forwards data signals received from the NMS 110 and the PSTN 112 to the subscriber lines 108. Further, the splitter may optionally comprise one or more filters to help direct data signals between the NMS 110, the PSTN 112, and the subscriber line 108. Additionally, the Exchange 102 may comprise at least one DSL transmitter/receiver (transceiver), which may exchange signals between the NMS 110, the PSTN 112, and the subscriber lines 108. The signals may be received and transmitted using the DSL transceiver, such as a modem. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 102 may be configured to transmit data at similar or different rates for each subscriber line 108.

In an embodiment, the Cabinet 104 may be located at a distribution center between the central office (CO) and customer premises and may comprise switches and/or splitters, which may couple the Exchange 102 to the CPEs 106. For instance, the Cabinet 104 may comprise a DSL access multiplexer (DSLAM) that couples the Exchange 102 to the CPEs 106. Additionally, the Cabinet 104 may comprise a DSL transceiver, which may be used to exchange signals between the Exchange 102 and the CPEs 106. The DSL transceiver may process the received signals or may simply pass the received signals between the CPEs 106 and the Exchange 102. The splitter in the Cabinet 104 may be a N:1 coupler (where N is an integer) that routes data signals received from the Exchange 102 to N CPEs 106, and routes data signals received from the N CPEs 106 to the Exchange 102. The data signals may be transmitted and received using the DSL transceiver, which may be a modem. Further, the splitter of the Cabinet 104 may optionally comprise one or more filters to help direct data signals between the Exchange 102 and the CPEs 106 via the corresponding subscriber lines 108. In an embodiment, the DSL transceiver may be configured to transmit data to the CPEs 106 at similar or different rates and/or power for each subscriber line 108, as described in detail below.

In an embodiment, the CPEs 106 may be located at the customer premises, where at least some of the CPEs 106 may be coupled to a telephone 114 and/or a computer 116. The telephone 114 may be hardware, software, firmware, or combinations thereof that generates, processes, and receives voice or other voice-band signals. The CPE 106 may comprise a switch and/or a splitter, which may couple the subscriber lines 108 and the telephone 114 and the computer 116. The CPE 106 may also comprise a DSL transceiver to exchange data between the CPE 106 and the Exchange 102 via the subscriber line 108. For instance, the splitter may be a 2:1 coupler that forwards data signals received from the subscriber line 108 to the telephone 114 and the DSL transceiver, and forwards data signals received from the telephone 114 and the DSL transceiver to the subscriber line 108. The splitter may optionally comprise one or more filters to help direct data signals to and from the telephone 114 and the DSL transceiver. The DSL transceiver, e.g. a modem, may transmit and receive signals through the subscriber lines 108. For instance, the DSL transceiver may process the received signals to obtain the transmitted data from the Exchange 102, and pass the received data to the telephone 114, the computer 116, or both. The CPEs 106 may be coupled to the Exchange 102 directly via the subscriber lines 108 and/or via the subscriber lines 108 and the Cabinet 104. For example any of the CPEs 106 may be coupled to a subscriber line 108 from the Exchange 102 and/or a subscriber line 108 from the Cabinet 104. The CPEs 106 may access the NMS 110, the PSTN 112, and/or other coupled networks via the subscriber lines 108 deployed by the Exchange 102 and/or the Cabinet 104.

In an embodiment, the subscriber lines 108 may be telecommunications paths between the Exchange 102 and the CPE 106 and/or between the Cabinet 104 and the CPEs 106, and may comprise one or more twisted-pairs of copper cable. Typically, crosstalk interference may occur between the tones or signals transported through the subscriber lines 108. The crosstalk interference may be related to the power, frequency, and travel distance of the transmitted signals and may limit the communications performance in the network. For instance, when the transmitted signals have higher power spectral densities (PSDs), e.g. over a range of frequencies, the crosstalk between the adjacent subscriber lines 108 (e.g. in a binder) may increase and hence the signal data-rates may decrease. The crosstalk may be highly non-stationary and may vary substantially during activation, use, and/or deactivation of a subscriber line 108, which may cause rapidly varying noise conditions and reduce line stability.

To guarantee sufficient line stability during rapidly varying noise conditions, for example due to non-stationary crosstalk, the transmissions in the subscriber lines 108 may be configured using virtual noise. For instance, the CO exchange 102 or the CPE 104 may receive a DSL signal that comprises a tone i and a transmitter referred virtual noise TXREFVN(i)

associated with the tone i. The transmitter referred virtual noise may be used to determine the SNR of the tone i, SNR(i):

$$SNR(i) = \frac{TXPSD(i) \cdot H(i)}{H(i) \cdot TXREFVN(i)},$$

where TXPSD(i) is a transmit spectrum power density of the tone i and H(i) is a channel gain on the tone i.

In an embodiment, the transmitter referred virtual noise may be configured to ensure line stability and may be calculated based on a noise level in the receiver, RXNOISE(i):

$$TXREFVN(i) = \frac{RXNOISE(i) \cdot SNRM_{min}}{H(i) \cdot SNRM},$$

where SNRM is a standard operating SNR margin, e.g. equal to about six decibel (dB), and $SNRM_{min}$ is a minimum margin required to ensure line stability, which may be as low as about zero dB. The transmit power spectrum density (PSD) may be calculated based on a medley reference PSD, MREFPSD(i) and a gain adjustment parameter $g_i$:

$$TXPSD(i) = MREFPSD(i) \cdot |g_i|^2.$$

The SNR of the tone i may be obtained by substituting for TXREFVN(i) in the equations above:

$$SNR(i) = \frac{TXPSD(i) \cdot H(i) \cdot SNRM}{RXNOISE(i) \cdot SNRM_{min}}.$$

The obtained SNR may then be used to determine the line bitloading for the tone i, $b_i$:

$$\begin{aligned} b_i &= \log_2\left(1 + \frac{1}{\Gamma}\frac{SNR(i)}{SNRM}\right) \\ &= \log_2\left(1 + \frac{1}{\Gamma}\frac{TXPSD(i) \cdot H(i)}{RXNOISE(i) \cdot SNRM_{min}}\right), \end{aligned}$$

where Γ is a SNR gap to capacity parameter, which may be typically set to about 9.75 dB minus a coding gain. Thus, line stability and operation may be maintained by adjusting the bitloading level in the line according to the line noise conditions. When the line noise is equal to the noise level in the receiver RXNOISE(i), the SNR margin SNRM may be equal to about the minimum margin $SNRM_{min}$, which may ensure line stability. The minimum margin $SNRM_{min}$ may be set to about zero dB or to a higher tolerated value, e.g. at about three dB. The minimum margin $SNRM_{min}$ may be substantially smaller than the SNR margin SNRM, which may reduce the virtual noise and increase the data-rate.

The RXNOISE(i) may be determined using a reported quite line noise QLN(i), which may not be updated during showtime (e.g. line activation time), and therefore give limited information about the noise condition during a modem's operation time. Further, QLN(i) may be measured when a near-end transmitter (e.g. at a cabinet) and a far-end transmitter (e.g. at a CO exchange) may be silent or inactive. During showtime, the near-end and far-end transmitters become active, and the powers of the transmitted signals may substantially increase, which may change the noise spectrum in the lines. For this reason, the reported quite line noise QLN(i) may provide a poor indication of the actual noise during operation time. In an embodiment, to overcome this problem, the noise level in the receiver RXNOISE(i) may be determined based on a reported SNR, reportedSNR(i), for a particular point in time:

$$RXNOISE(i) = \frac{TXPSD(i) \cdot H(i)}{reportedSNR(i)}.$$

Hence, the transmitter referred virtual noise TXREFVN(i) may be calculated:

$$TXREFVN(i) = \frac{TXPSD(i) \cdot SNRM_{min}}{reportedSNR(i) \cdot SNRM}.$$

To improve line stability, the virtual noise may be configured by addressing a plurality of practical issues related to line operations. For instance, a history of the line's noise condition may be needed to accurately configure the virtual noise in the line. In an embodiment, the virtual noise may be configured accurately using the history of the noise condition based on a representative sample or measurement of line noise conditions. For instance, the virtual noise for each tone may be calculated based on a plurality of samples or measurements of TXPSD(i) and reportedSNR(i) that may be obtained over a time period, e.g. in a periodic manner. The virtual noise may be calculated to protect against the worst case noise condition over that time using a maximum TXPSD (i) to reportedSNR(i) ratio over that time:

$$TXREFVN(i) = \frac{SNRM_{min}}{SNRM}\max_t\{TXNOISE_t(i)\}, \tag{1}$$

where max{ } indicates a function for selecting a maximum sample from a set, $$TXNOISE_t(i) = \frac{TXPSD_t(i)}{reportedSNR_t(i)}$$

is a transmitter referred line noise, and $TXPSD_t(i)$ and $reportedSNR_t(i)$ are samples obtained at a time t. Using the maximum transmitter referred line noise over time $$\left(\max_t\{TXNOISE_t(i)\}\right) \text{ to calculate } TXREFVN(i)$$

may ensure relatively high line stability but may also substantially reduce the line data-rate, which may be unnecessary.

Balancing line stability vs. data-rate is another practical issue that may be addressed when configuring the virtual noise. In an embodiment, a tradeoff may be achieved between line stability and data-rate based on statistics of the line noise measurements, for instance using a mean of the transmitter referred line noise, $TXNOISE_{mean}(i)$, and a standard deviation of the transmitter referred line noise $TXNOISE_{std}(i)$:

$$TXREFVN(i) = \frac{SNRM_{min}}{SNRM}(TXNOISE_{mean}(i) + v \cdot TXNOISE_{std}(i)). \tag{2}$$

The mean of the transmitter referred line noise $TXNOISE_{mean}(i)$, and the standard deviation of the transmitter referred line noise $TXNOISE_{std}(i)$ may be calculated:

$$TXNOISE_{mean}(i) = \frac{1}{T}\sum_{t} TXNOISE_t(i) \text{ and}$$

$$TXNOISE_{std}(i) = \sqrt{\frac{1}{T}\sum_{t}(TXNOISE_t(i) - TXNOISE_{mean}(i))^2},$$

where T is the total quantity of time samples obtained. In equation (2), v is a multiple of standard deviations away from the mean of the virtual noise. The value of v may be selected to determine a confidence interval or amount of certainty that the line noise is below the virtual noise. For example, the value of v may be equal to about two, which may correspond to an amount of certainty at about 97 percent.

Another practical issue of virtual noise configuration is the memory requirement. Using the history of the noise condition to configure the virtual noise may require collecting and storing the samples of noise conditions over a period of time, which may require substantial memory allocation, e.g. by the NMS. The memory requirement may further increase as the quantity of lines in the network increases. In an embodiment, the virtual noise configured based on the line noise condition may be adjusted based on a most recent or current virtual noise setting. For instance, the virtual noise $TXREFVN_t(i)$ may be configured based on an update rule that depends on the last calculated virtual noise $TXREFVN_{t-1}(i)$, such as $$TXREFVN_t(i) = \begin{cases} \frac{SNRM_{min}}{SNRM} TXNOISE_t(i), \\ \quad \text{if } \frac{SNRM_{min}}{SNRM} TXNOISE_t(i) > TXREFVN_{t-1}(i), \\ \alpha \cdot TXREFVN_t(i) + (1+\alpha) \cdot \frac{SNRM_{min}}{SNRM} TXNOISE_t(i) \\ \quad \text{if } \frac{SNRM_{min}}{SNRM} TXNOISE_t(i) \le TXREFVN_{t-1}(i), \end{cases} \quad (3)$$

where α is a factor that determines how long a noise condition may be remembered. Since the virtual noise may be calculated based on the last value (e.g. corresponding to the last sample of noise condition) without the entire obtained samples, the memory requirement for virtual noise configuration may be substantially reduced.

The factor α in the equation above may be changed to allow different trade-offs between line stability and data-rate. The factor α may be determined based on a half-life λ for virtual noise adaptation to line noise condition. The half-life λ may be a time required for the virtual noise value to decay or decrease to its half value if the line noise is equal to bout zero. For instance, if $$TXNOISE_t(i) = \begin{cases} 1, & t = 0 \\ 0, & t > 0 \end{cases} \text{ and } SNRM_{min} = SNRM, \text{ then}$$

$$TXREVFVN_t(i) = 0.5 \text{ when } t = \frac{\lambda}{measurementPeriod},$$

where measurementPeriod is a period between line noise measurements. To achieve a half-life equal to about one, the factor α may be set:

$$\alpha = 2^{-\frac{measurementPeriod}{\lambda}}.$$

For example, if the period between line noise measurements is equal to about 15 minutes, e.g. the measurements of reportedSNR(i) and TXPSD(i) are updated every about 15 minutes, then a half-life of about six hours may be achieved by setting $$\alpha = 2^{-\frac{15}{360}} = 0.9715.$$

Another consideration is the adaptability of the virtual noise configuration, where changes to the noise environment may be monitored over time and the virtual noise may be adjusted accordingly. Adaptability may be improved when a relatively small time window is used to monitor the changing noise environment. Using the last time sample of noise condition to configure the virtual noise, as shown above, may allow faster tracking of changes in line conditions and faster response. Additionally, the last sample of noise condition in time may be based on preceding samples of noise condition, and thus may comprise information about the line noise condition over a time window substantially larger than last monitored time window. As such, the virtual noise may be configured to adapt to the line noise condition over time and may be calculated accurately based on sufficient line history of the noise condition.

Figure 2:
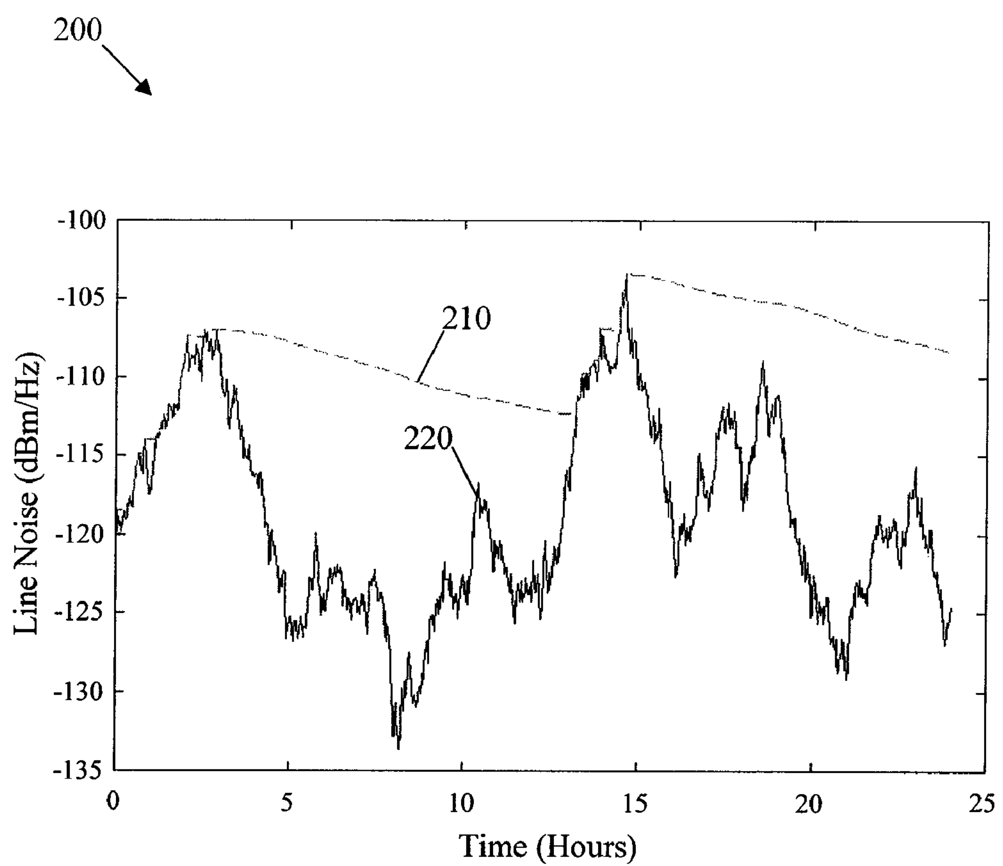
FIG. 2 is a chart of an embodiment of a virtual noise configuration.

FIG. 2 illustrates an embodiment of a virtual noise configuration 200, which may be adaptive to changing line conditions over a period of time. The virtual noise configuration 200 is represented by a curve 210 that comprises a plurality of points. The points correspond to the calculated virtual noise values over a plurality of hours using the update rule in equation (3). Accordingly, the virtual noise value at a time t ($TXREFVN_t(i)$) in the curve 210 is calculated using the last calculated virtual noise value at time t−1 ($TXREFVN_{t-1}(i)$) and the obtained transmitter referred line noise at time t ($TNOISE_t(i)$). The curve 220 comprises a plurality of points that correspond to the obtained $TXNOISE_t(i)$ values over the same time as the curve 210.

The adaptability of the virtual noise to the transmitter referred line noise over the time period may be observed by comparing the patterns of the curve 210 and the curve 220. As the values of the curve 220 that represent line noise conditions increase over time, the values of the curve 210 may also increase at about the same rate. For example the increasing portions of the curve 210 and 220 may have about the same slope, e.g. between about zero hour and about 2.5 hours and between about 13 hours and about 15 hours. The matching rate between the increasing portions in the two curves may indicate fast virtual noise response to increasing line noise.

Further, as the values of the curve 220 decrease over time, the values of the curve 210 may decrease at a slower rate (smaller slope), e.g. between about 2.5 hours and about five hours and between about 15 hours and about 17 hours, in comparison to its increasing rate. The rate of decrease or decay in the curve 210 may be determined by the factor α in equation (3), which may be equal to about 0.9715 and correspond to a measurement period equal to about 15 minutes and a half-life decay equal to about six hours. The slower rate of the curve 210 may indicate a slow virtual noise response to decreasing line noise in comparison to the case of increasing line noise. A slower virtual noise response to decreasing line noise may be desired to account for sudden noise rising and/or relatively strong noise fluctuations, e.g. between about 7.5 hours and 13 hours and between about 16 hours and about 18 hours. The relatively slow virtual noise response to such sharp and sudden changes in line conditions may prevent substantial and abrupt changes in line data-rate and hence improve line stability.

Another practical issue for virtual noise configuration may be the limited quantity of line profiles that may be supported by the DSL system. For instance, a DSLAM (e.g. in a CO exchange or cabinet) may support a limited quantity of line profiles, which may be less than the quantity of subscriber lines in the system. Each line profile may be associated with a virtual noise configuration, which may be stored as part of the line profile. Thus, it may not be possible to use a distinct virtual noise configuration for each subscriber line. In an embodiment, a plurality of virtual noise templates may be established and used to service the subscriber lines, as described below.

Figure 3:
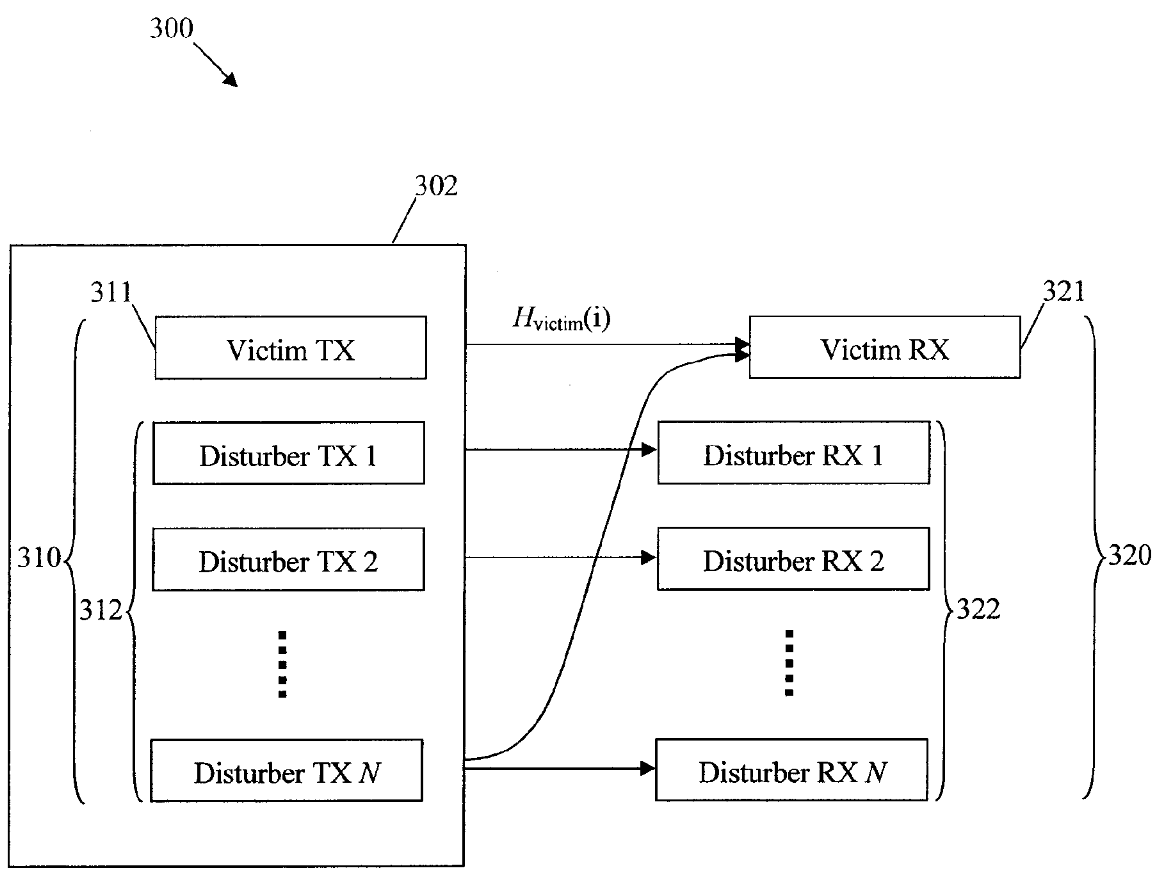
FIG. 3 is a schematic diagram of an embodiment of a downstream transmission scenario.

FIG. 3 illustrates one embodiment of a downstream transmission scenario 300 in a DSL system. The DSL system may comprise a combination transmitter 302 comprising a plurality of transmitters 310, which may be coupled to a plurality of receivers 320. For instance, the combination transmitter 302 may be a modem or a DSLAM in a CO exchange or a cabinet, where the transmitters 310 may be located. The receivers 320 may be located at separate locations in the system, for example at a plurality of CPEs. The transmitters 310 and the receivers 320 may be configured to transmit and receive, respectively, DSL signals or tones via a plurality of subscriber lines, e.g. similar to the components of the DSL system 100. Some of the lines between the transmitters 310 and receivers 320 may suffer from crosstalk. The crosstalk may be non-stationary and may vary substantially and hence cause rapidly varying noise conditions and reduce line stability.

Ideally, line stability may be ensured by configuring the virtual noise for each of the subscriber lines individually. However, configuring the virtual noise for each line may require allocating a separate profile for each line, which may not be possible due to the limited quantity of available profiles for the transmitters 310 (e.g. in the DSLAM). In an embodiment, to improve line stability in the subscriber lines between the transmitters 310 and the receivers 320, a set of virtual noise templates may be defined. The quantity of virtual noise templates may be equal to about the quantity of available profiles and may be configured based on a plurality of noise conditions that may be encountered. The virtual noise templates (and associated profiles) may be assigned to the lines that have actual noise conditions that most closely match the noise conditions of the virtual noise templates. Thus, the noise conditions that may be encountered in the lines may be addressed or accounted for using fewer virtual noise templates than the quantity of lines in the system. Consequently, the quantity of line profiles that may be needed for virtual noise configuration may be substantially reduced.

For instance, the transmitters 310 may comprise at least one victim transmitter (TX) 311 that may communicate with a victim receiver (RX) 321 in the receivers 320 in a downstream direction, e.g. from transmitter to receiver. The transmitters 310 may also comprise about N disturber TXs 312 (e.g. disturber TX 1, disturber TX 2 . . . disturber TX N) that may communicate downstream with N corresponding disturber RXs 322 (e.g. disturber RX 1, disturber RX 2 . . . disturber RX N) via N individual lines, where N is an integer. The signals in a victim line from the victim TX 311 to the victim RX 321 may be disturbed due to crosstalk interference by transmissions from at least one of the disturber TXs 312, e.g. disturber TX N. Thus, the victim line may comprise a worst case downstream crosstalk channel from the victim TX 311 and one of the disturber TXs 312, e.g. disturber TX N.

A crosstalk model may be used to define the worst case downstream crosstalk channel, such as based on an American National Standard T1.424-2004 by the Alliance for Telecommunications Industry Solutions (ATIS) or based on a European Telecommunications Standard Institute (ETSI) Standard TS 101 270-1, which are incorporated herein by reference as if reproduced in their entirety. For instance, a 1% worst case downstream crosstalk channel may be defined:

$$H_{xtalk,1\%\ worst\ case}(i) = \sum_{n=1}^{N} H(i)\cdot K_{xf}^2\cdot f(i)^2\cdot L_{coupling\ n},$$

where H(i) is a direct channel gain of the victim line from one of the disturber TXs 512, $K_{xf}^2$ is equal to about −45 dB, f(i) is a frequency of tone i in Megahertz (MHz), and $L_{coupling\ n}$ is a coupling length from the disturber TX N into the victim line. Using this model, the 1% worst case crosstalk channel (or noise) at the victim RX 321 may be calculated:

$$RXNOISE_{1\%\ worst\ case}(i) = \sum_{n=1}^{N} H(i)\cdot K_{xf}^2\cdot f(i)^2\cdot \underbrace{\sum_{n} L_{coupling\ n}}_{\beta}\cdot TemplatePSD(i),$$

where $\beta=\Sigma_n L_{coupling\ n}$ is a factor that denotes the severity of the crosstalk. The transmit PSD TemplatePSD(i) may be about the same for all the lines between the transmitters 310 and receivers 320, e.g. at about 3.5 dB below a limit PSD profile or mask (maximum transmission power). Thus, the transmitter referred line noise $TXNOISE_{1\%\ worst\ case}$ corresponding to the 1% worst case crosstalk may be obtained:

$$TXNOISE_{1\%\ worst\ case} = \frac{RXNOISE_{1\%\ worst\ case}(i)}{H(i)} = K_{xf}^2\cdot f(i)^2\cdot\beta\cdot TemplatePSD(i).$$

Each or a plurality of virtual noise templates (VNTEMPLATE) may be based on the 1% worst case crosstalk model and the factor β, which may determine how severe the crosstalk may be in comparison to the worst case model. For example, there may be M virtual noise templates that may be supported by the DSLAM, e.g. $VNTEMPLATE_1(i)$, $VNTEMPLATE_2(i)$ . . . $VTEMPLATE_M(i)$, where M may be an integer less than N. The virtual noise templates may be configured based on the severity of crosstalk, e.g. on increasing severity of crosstalk, obtained:

$$\left.\begin{aligned} &VNTEMPLATE_1(i) = K_{xf}^2\cdot f(i)^2\cdot TemplatePSD(i),\\ &VNTEMPLATE_2(i) = 2^{-1}\cdot K_{xf}^2\cdot f(i)^2\cdot TemplatePSD(i),\\ &\vdots\\ &VNTEMPLATE_M(i) = 2^{-M}\cdot K_{xf}^2\cdot f(i)^2\cdot TemplatePSD(i).\end{aligned}\right\uparrow \text{Increasing severity of crosstalk}$$

The virtual noise templates may be arranged in increasing severity of crosstalk, where the first virtual noise template $VNTEMPLATE_1(i)$ may be configured for a highest crosstalk or noise level and the M-th virtual noise template $VNTEMPLATE_M(i)$ may be configured for a lowest crosstalk or noise level. In the equations in the above embodiments, the factor $2^{-m}$ (e.g. $2^0, 2^{-1} \ldots 2^{-M}$) may determine the magnitude of the virtual noise templates, e.g. the PSD values across the range of frequencies. The factor $2^{-m}$ may decrease the PSD values in the order from highest to lowest severity of crosstalk. In other embodiments, another factor g(m), which may be a function that varies according to m, may be used to determine the magnitude of the virtual noise templates. For example, g(m) may decrease as m increases to reduce the PSD values in the order from highest to lowest severity of crosstalk.

Figure 4:
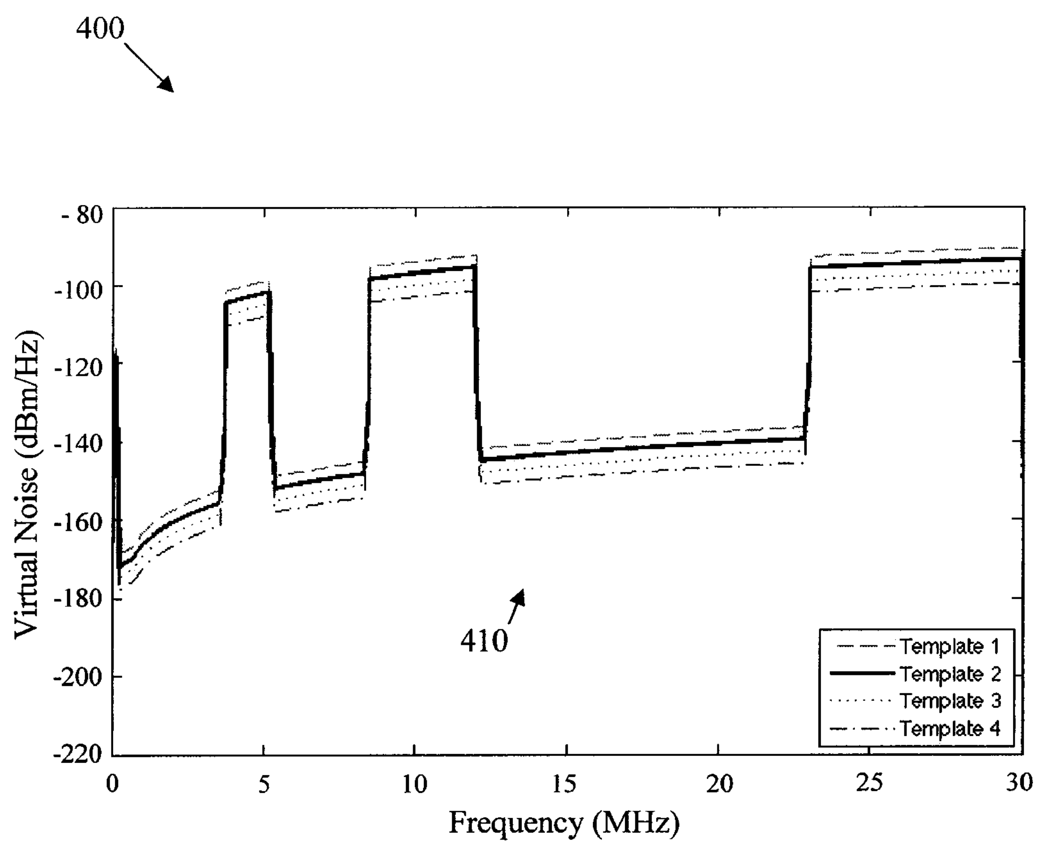
FIG. 4 is a chart of an embodiment of a plurality of virtual noise templates.

FIG. 4 illustrates an embodiment of a plurality of virtual noise templates 400, which may be configured based on the equations above for a plurality of crosstalk or noise levels. The virtual noise templates 400 are represented by a plurality of curves 410 that comprise a plurality of points. The points correspond to virtual noise values in decibels per milliwatt per Hertz (dBm/Hz) vs. a range of frequencies in MHz (from about zero MHz to about 30 MHz). The curves 410 are shown for five virtual noise templates, which may be configured for the first five highest crosstalk levels (e.g. Template 1, Template 2 . . . Template 5). As shown in the equations above, the virtual noise templates are obtained using a substantially similar equation with the exception of a varying multiplying factor that may be varied according to the crosstalk or noise level, e.g. at about $2^{-M}$ for the M-th template. Accordingly, the curves 410 have a substantially similar pattern or profile across the range of frequencies but vary in magnitude (virtual noise value). The first virtual noise template (Template 1) may comprise the highest virtual noise values and may be used to configure any of the lines in the case of the highest crosstalk severity. Generally, any of the lines may be configured using any of the virtual noise templates that best matches the crosstalk severity in the line.

Figure 5:
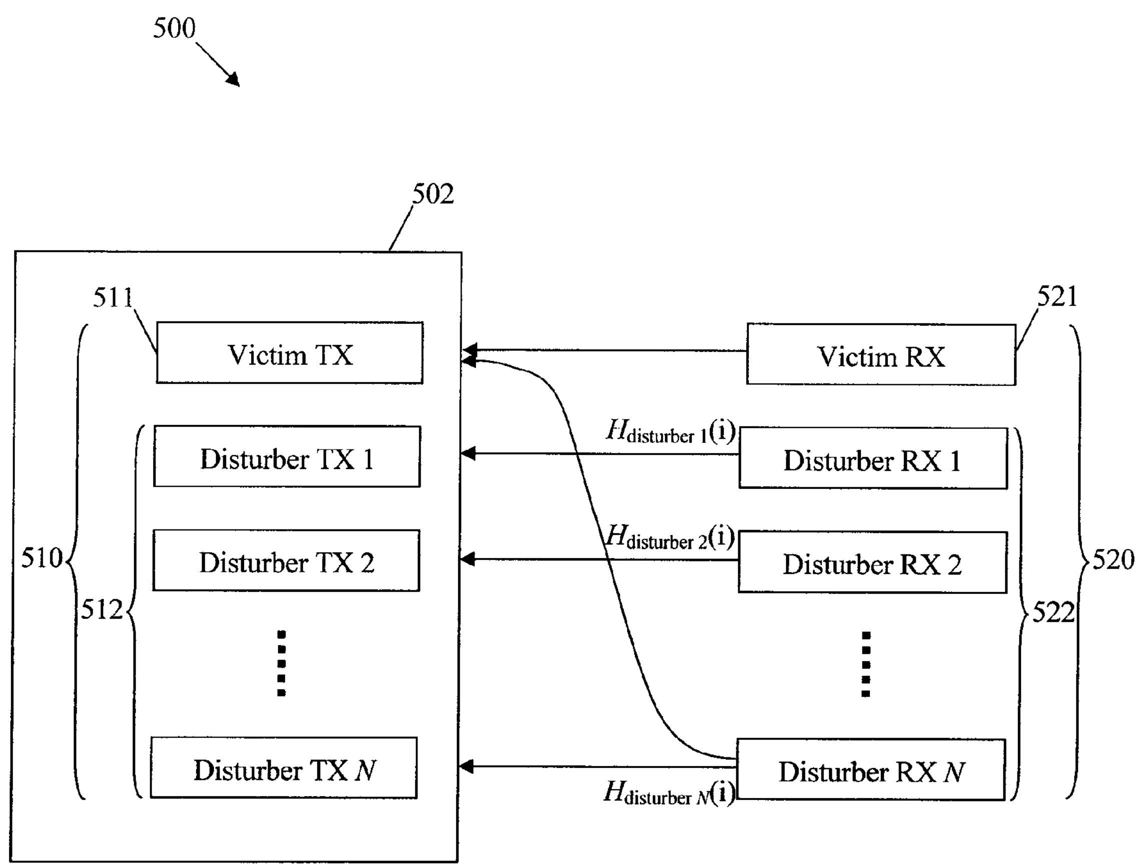
FIG. 5 is a schematic diagram of an embodiment of an upstream transmission scenario.

FIG. 5 illustrates one embodiment of an upstream transmission scenario 500 in a DSL system, for instance similar to the DSL system of FIG. 3. As shown in FIG. 5, the DSL system may comprise a combination transmitter 502 comprising a plurality of transmitters 510, which may be coupled to a plurality of receivers 520. The combination transmitter 502 may be a modem or a DSLAM in a CO exchange or a cabinet, where the transmitters 510 may be located. The receivers 520 may be located at a separate location in the system, for example at a plurality of CPEs. The transmitters 510 and the receivers 520 may be configured to transmit and receive, respectively, DSL signals or tones via a plurality of subscriber lines. The lines may suffer from non-stationary and substantially varying crosstalk levels, which may reduce data-rate stability in the lines. To improve line stability in the lines, a plurality of virtual noise templates may be defined, e.g. for a plurality of crosstalk levels in the lines. The quantity of virtual noise templates may be limited to about the quantity of line profiles supported by the combination transmitter 502 (e.g. in a DSLAM) and may be less than the quantity of lines in the DSL system.

A victim receiver 521 in the receivers 520 may communicate with a victim TX 511 in the transmitters 510 in an upstream direction, e.g. from receiver to transmitter. A plurality of N disturber RXs 522 (e.g. disturber RX 1, disturber RX 2 . . . disturber RX N) may also communicate with a plurality of N corresponding disturber TXs 512 (e.g. disturber TX 1, disturber TX 2 . . . disturber TX N) in the transmitters 510 via N individual lines, where N is an integer. The signals in a victim line from the victim RX 521 to the victim TX 511 may be disturbed from crosstalk interference by transmissions from at least one of the disturber RXs 522, e.g. disturber RX N. Thus, the victim line may comprise a worst case upstream crosstalk channel from the victim RX 521 and at least one of the disturber RXs 522, e.g. disturber TX N.

Based on the ATIS or ETSI standards described above, a 1% worst case upstream crosstalk channel may be defined:

$$H_{xtalk,1\%\ worst\ case}(i) = \sum_n H(i)_{disturber\ n} \cdot K_{xf}^2 \cdot f(i)^2 \cdot L_{coupling\ n},$$

where $H_{disturber\ n}(i)$ is a direct channel gain of the victim line from one of the disturber RXs 522. In the case of upstream transmissions, the receivers 520 may communicate with the transmitters 510 using upstream power back-off (UPBO), which is a static spectrum management technique that is used to reduce crosstalk in the lines. As such, the upstream transmit PSD of the n-th disturber RX 522, $UPBOMASK_n(i)$, may be obtained:

$$UPBOMASK_n(i) = \frac{UPBOPSD(i)}{H_{disturber\ n}(i)},$$

where UPBOPSD(i) denotes the UPBO reference PSD, e.g. based on an International Telecommunication Union (ITU) Standard G.997.1, which is incorporated herein by reference as if reproduced by its entirety. The transmitted PSD or the UPBO reference PSD may be used to obtain the 1% worst case upstream crosstalk channel (or noise) at the victim TX 511:

$$\begin{aligned} RXNOISE_{1\%\ worst\ case}(i) &= \sum_n H(i)_{disturber\ n} \cdot K_{xf}^2 \cdot f(i)^2 \cdot L_{coupling\ n} \cdot \\ &\quad UPBOMASK_n(i), \\ &= K_{xf}^2 \cdot f(i)^2 \cdot \beta \cdot UPBOPSD(i). \end{aligned}$$

Thus, the transmitter referred line noise $TXNOISE_{1\%\ worst\ case}$ corresponding to the 1% worst case crosstalk may be obtained:

$$\begin{aligned} TXNOISE_{1\%\ worst\ case} &= \frac{RXNOISE_{1\%\ worst\ case}(i)}{H(i)} \\ &= \frac{1}{H(i)} K_{xf}^2 \cdot f(i)^2 \cdot \beta \cdot UPBOPSD(i). \end{aligned}$$

The term H(i) in the equation above may have different values depending on the length of the victim line or loop. A plurality of virtual noise templates may be defined for a plurality of loop lengths between the transmitters 510 and receivers 520, e.g. at about 200 meters, about 300 meters . . . 1200 meters. The loop lengths may be denoted as $L_1, L_2 \ldots L_V$, which correspond to V line or loop lengths, where V is an integer. For each loop length, there may be M virtual noise templates. For example, for the v-th loop length, a plurality of M virtual noise templates may be calculated based on the crosstalk severity in the line:

$$VNTEMPLATE_{v,1}(i) = \frac{1}{H_v(i)} K_{xf}^2 \cdot f(i)^2 \cdot UPBOPSD(i),$$

-continued $$VNTEMPLATE_{v,2}(i) = 2^{-1} \cdot \frac{1}{H_v(i)} \cdot K_{xf}^2 \cdot f(i)^2 \cdot UPBOPSD(i),$$

$$\vdots$$

$$VNTEMPLATE_{v,M}(i) = 2^{-M} \cdot \frac{1}{H_v(i)} \cdot K_{xf}^2 \cdot f(i)^2 \cdot UPBOPSD(i).$$

The M virtual noise templates for the v-th loop length may be arranged in increasing severity of crosstalk, where the first virtual noise template $VNTEMPLATE_{v,1}(i)$ may be configured for a highest crosstalk or noise level and the M-th virtual noise template $VNTEMPLATE_{v,M}(i)$ may be configured for a lowest crosstalk or noise level. In the equations above, the factor $2^{-m}$ may decrease the PSD values in the order from highest to lowest severity of crosstalk. In other embodiments, another factor g(m), which may be a function that varies according to m, may be used to determine the magnitude of the virtual noise templates. For example, g(m) may decrease as m increases to reduce the PSD values in the order from highest to lowest severity of crosstalk.

In some embodiments, the combined transmitter 502 may be located in a cabinet and the transmitters 510 may communicate with the receivers 520 using downstream power back-off (DPBO) to reduce crosstalk in the lines. As such, the downstream transmit PSD of the n-th disturber TX 512, $DPBOMASK_n(i)$, may be set based on an E-side electric length of the line, DPBOESEL, e.g. according to the ITU standard G.997.1. The downstream transmitted PSD may be used to obtain the transmitter referred line noise $TXNOISE_{1\%\ worst\ case}$ corresponding to the 1% worst case crosstalk channel:

$$TXNOISE_{1\%\ worst\ case} K_{xf}^2 \cdot f(i)^2 \cdot \beta \cdot DPBOPSD(i).$$

A plurality of virtual noise templates may be defined for a plurality of E-side electric lengths corresponding to the different lines, e.g. for about V E-side electric lengths denoted as $DPBOESEL_1$, $DPBOESEL_2$ . . . $DPBOESEL_V$, where V is an integer. For each E-side electric length, there may be M virtual noise templates. For example, for the v-th E-side electric length, the M virtual noise templates may be calculated based on the crosstalk severity in the line, e.g. in increasing severity of crosstalk:

$$VNTEMPLATE_{v,1}(i) = K_{xf}^2 \cdot f(i)^2 \cdot DPBOPSD_v(i),$$

$$VNTEMPLATE_{v,2}(i) = 2^{-1} \cdot K_{xf}^2 \cdot f(i)^2 \cdot DPBOPSD_v(i),$$

$$\vdots$$

$$VNTEMPLATE_{v,M}(i) = 2^{-M} \cdot K_{xf}^2 \cdot f(i)^2 \cdot DPBOPSD_v(i),$$

where $DPBOPSD_v(i)$ is the DPBO PSD corresponding to the v-th E-side electric length. In other embodiments, other virtual noise templates models may be defined based on other worst case crosstalk channel models. In the equations above, the factor $2^{-m}$ may decrease the PSD values in the order from highest to lowest severity of crosstalk. In other embodiments, another factor g(m), which may be a function that varies according to m, may be used to determine the magnitude of the virtual noise templates. For example, g(m) may decrease as m increases to reduce the PSD values in the order from highest to lowest severity of crosstalk.

Figure 6:
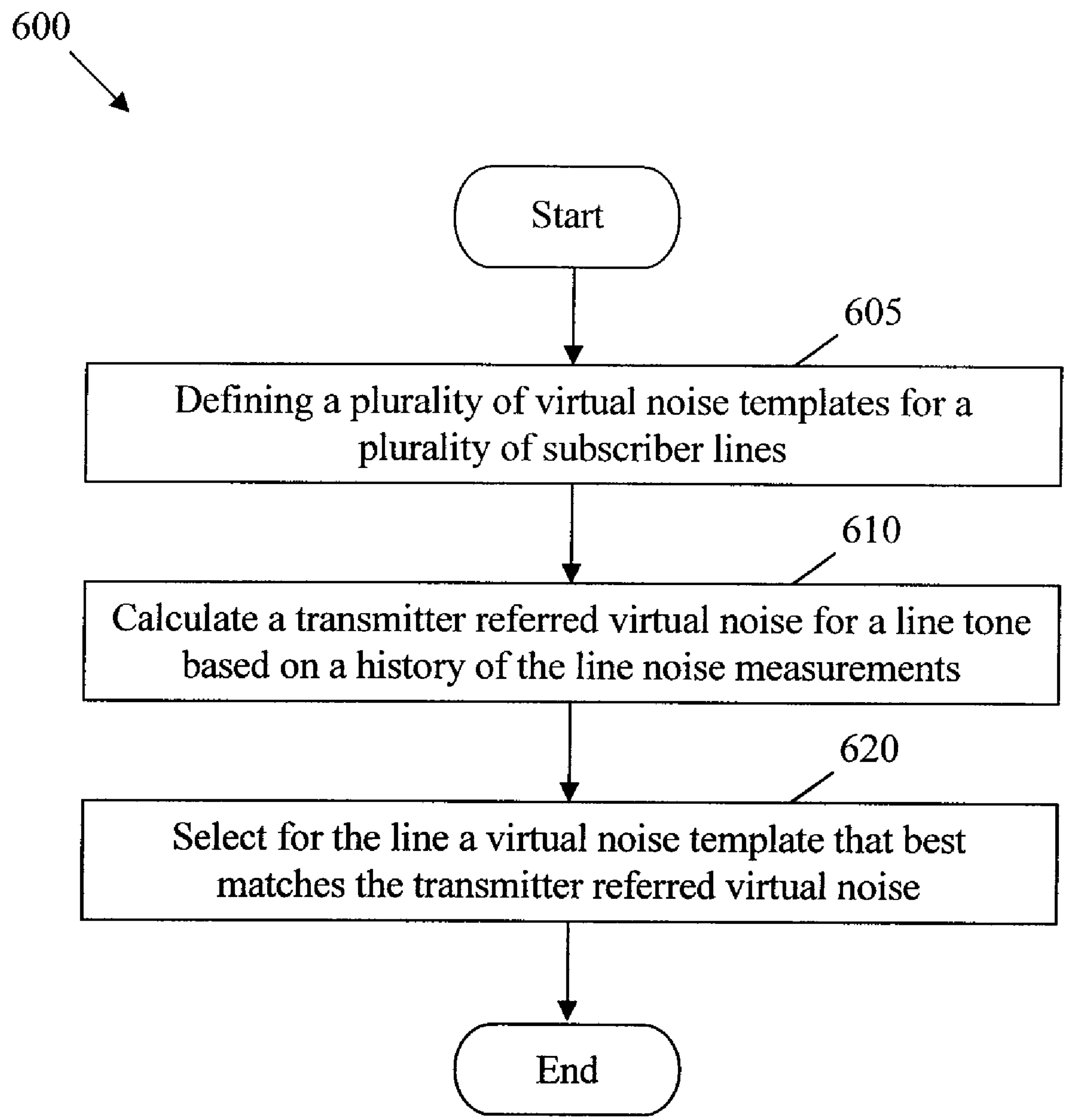
FIG. 6 is a flowchart of an embodiment of a virtual noise configuration method.

FIG. 6 illustrates an embodiment of a virtual noise configuration method 600, which may be used to improve line stability in a subscriber line. The virtual noise may be configured by selecting one of a plurality of defined virtual noise templates for the line. The virtual noise template may be selected according to a transmitter referred virtual noise that may be calculated for a tone in the line. The method 600 may begin at block 605, where a plurality of virtual noise templates may be defined for a plurality of subscriber lines, such as for the downstream transmission scenario 300 or the upstream transmission scenario 500.

At block 610, the transmitter referred virtual noise for a line tone may be calculated based on a history of the line noise measurements. For example, the transmitter referred virtual noise TXREFVN(i) may be calculated using equation (1) based on the standard operating SNR margin SNRM, the minimum margin required to ensure line stability $SNRM_{min}$, and the maximum transmitter referred line noise over time $$\max_t \{TXNOISE_t(i)\}.$$

Alternatively, TXREFVN(i) may be calculated using equation (2) based on SNRM, $SNRM_{min}$, a mean of the transmitter referred line noise $TXNOISE_{mean}(i)$, and a standard deviation of the transmitter referred line noise $TXNOISE_{std}(i)$. In an alternative embodiment, TXREFVN(i) may be calculated using equation (3) for adaptive tracking of line noise condition. In other embodiments, TXREFVN(i) may be calculated using other methods that may be based on the history of the line noise measurements.

Next at block 620, a virtual noise template that best matches the transmitter referred virtual noise may be selected for the line. For example, the lowest power virtual noise template $VNTEMPLATE_{v,m}(i)$ that captures TXREFVN(i), e.g. that has larger power than TXREFVN(i), may be selected. Selecting the lowest power virtual noise template $VNTEMPLATE_{v,m}(i)$ that captures TXREFVN(i) may be expressed mathematically:

$$v^*, m^* = \operatorname*{argmin}_{v,m} \sum_i VTEMPLATE_{v,m}(i)$$

such that $TXREFVN(i) \leqq VTEMPLATE_{v,m}(i),\ \forall i$, where min{ } indicates a function for selecting a maximum sample from a set, v indicates the line and m indicates the virtual noise template. Alternatively, $VNTEMPLATE_{v,m}(i)$ that has the least of squares fit with TXREFVN(i) may be selected, which may be expressed mathematically:

$$v^*, m^* = \operatorname*{argmin}_{v,m} \left\{ \sum_i |TXREFVN(i) - VTEMPLATE_{v,m}(i)|^2 \right\}.$$

In an alternative embodiment, the virtual noise template that may achieve the highest data-rate and capture TXREFVN(i) may be selected, such as $$v^*, m^* = \operatorname*{argmin}_{v,m} \left\{ \sum_i \log_2 \left( 1 + \frac{1}{\Gamma} \frac{TXPSD(i)}{VTEMPLATE_{v,m}(i)} \right) \right\}$$

such that $TXREFVN(i) \leqq VTEMPLATE_{v,m}(i),\ \forall i$, where Γ is the SNR gap to capacity and may be equal to about 9.75 dB plus SNRM minus a coding gain. For example, SNRM may be equal to about six dB, the coding gain may be equal to about four dB, and Γ may be equal to about 11.75 dB. In other embodiments, the virtual noise template may be selected using other methods that may depend on the transmitter referred virtual noise. The method may end after block 620.

In an embodiment, the virtual noise templates may be stored using a set of breakpoints. The breakpoints may correspond to PSD values or levels for a plurality of frequencies, which may define the PSD curves or profiles of the virtual noise templates. The PSD profiles of the virtual noise templates (or virtual noise PSDs) may be calculated, e.g. for the range of frequencies, by interpolating the PSD values at each of the breakpoints. Thus, the virtual noise templates may be converted into PSD profiles for each tone i in the line before comparing the virtual noise PSDs with TXREFVN(i) to find a best match. Alternatively, TXREFVN(i) may be converted into a set of breakpoints corresponding to PSD levels and may then be compared to the breakpoints corresponding to the PSD levels of the virtual noise templates.

Figure 7:
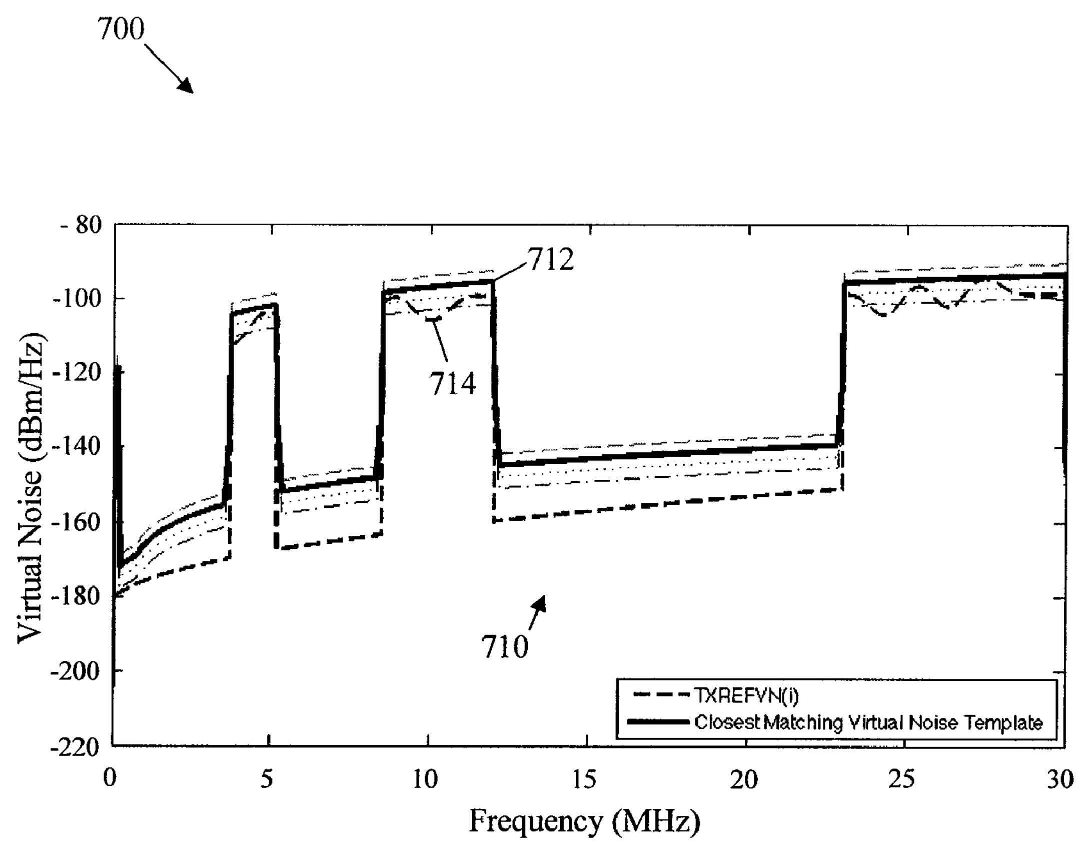
FIG. 7 is a chart of an embodiment of a best matched virtual noise template.

FIG. 7 illustrates an embodiment of a best matched virtual noise template 700, which may be selected for a transmitter referred virtual noise in a subscriber line. The best matched virtual noise template 700 may be obtained from a plurality of virtual noise templates, which may be obtained as described above. The virtual noise templates may be represented by a plurality of curves 710 that comprise a plurality of points. The points correspond to virtual noise values in dBm/Hz vs. a range of frequencies in MHz (from about zero MHz to about 30 MHz). The curves 710 may be the PSD curves of the virtual noise templates. The curves 710 include a curve 712 that is matched to a curve 714. The curve 712 represents a virtual noise template that best matches the transmitter referred virtual noise in the subscriber line, which is represented by the curve 714. The best matched virtual noise template may capture the TXREFVN(i), e.g. may be the smallest PSD curve that is higher than the PSD curve of the transmitter referred virtual noise in a subscriber line. In an alternative embodiment, a virtual noise template that is different from the virtual noise template corresponding to the curve 712 may be selected as the best match for the transmitter referred virtual noise in the subscriber line corresponding to the curve 714. For instance, the best matched virtual noise template may have the best least squares fit with TXREFVN (i) or may achieve the highest data-rate and capture TXREFVN(i). As such, another curve from the curves 710 that is different from the curve 712 may be matched with the curve 714.

Figure 8:
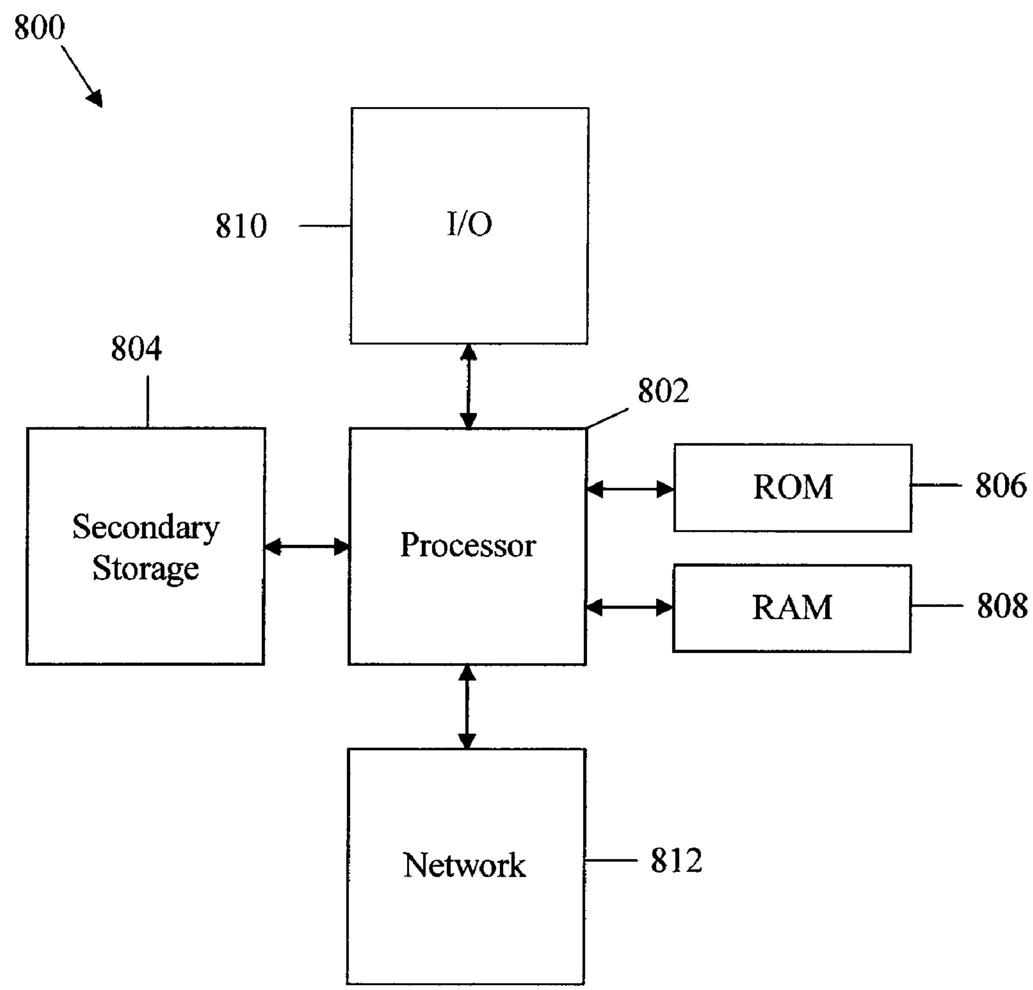
FIG. 8 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 may include a processor 802 (which may be referred to as a central processor unit or CPU) that is in communication with any memory devices including secondary storage 804, read only memory (ROM) 806, random access memory (RAM) 808, input/output (I/O) devices 810, and network connectivity devices 812, or combinations thereof. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:

a digital subscriber line (DSL) transmitter configured to transmit a transmitter referred virtual noise for a tone in a subscriber line, wherein the transmitter referred virtual noise is based on a time history of a noise condition in the subscriber line, wherein the transmitter referred virtual noise is obtained by:

$$TXREFVN(i) = \frac{TXPSD(i) \cdot SNRM_{min}}{reportedSNR(i) \cdot SNRM},$$

where TXREFVN(i) is the transmitter referred virtual noise for the DSL tone i, TXPSD(i) is a transmit spectrum power density of the tone in the line, SNRM is a standard operating signal to noise ratio (SNR) margin, reportedSNR(i) is a reported SNR for the point in time and $SNRM_{min}$ is a minimum SNR margin that is less than the standard operating SNR margin.

2. The apparatus of claim 1, wherein the transmitter is a combination transmitter, and wherein the transmitter is coupled to a plurality of receivers via a plurality of the subscriber lines.

3. The apparatus of claim 2, wherein at least some of the subscriber lines are configured using a virtual noise template that best matches the transmitter referred virtual noise from a plurality of virtual noise templates, and wherein a quantity of virtual noise templates corresponds to a quantity of line profiles supported by the transmitter.

4. The apparatus of claim 3, wherein the transmitter is a DSL access multiplexer (DSLAM) that supports the line profiles, wherein the quantity of line profiles is less than the quantity of subscriber lines.

5. The apparatus of claim 2, wherein the transmitter is located at a central office (CO) exchange or a cabinet and the receivers are located at a plurality of customer premises equipments (CPEs).

6. An apparatus comprising:

at least one processor configured to:

obtain a transmitter referred virtual noise for a digital subscriber line (DSL) tone using a plurality of noise condition measurements; and determine a DSL bitloading using the transmitter referred virtual noise, wherein the transmitter referred virtual noise is obtained by:

$$TXREFVN(i) = \frac{TXPSD(i) \cdot SNRM_{min}}{reportedSNR(i) \cdot SNRM},$$

where TXREFVN(i) is the transmitter referred virtual noise for the DSL tone i, TXPSD(i) is a transmit spectrum power density of the tone in the line, SNRM is a standard operating signal to noise ratio (SNR) margin, reportedSNR(i) is a reported SNR for the point in time, and $SNRM_{min}$ is a minimum SNR margin that is less than the standard operating SNR margin.

7. The apparatus of claim 6, wherein the transmitter referred virtual noise protects against a worst case noise condition over a time period and is obtained by:

$$TXREFVN(i) = \frac{SNRM_{min}}{SNRM} \max_t \{TXNOISE_t(i)\},$$

where $$\max_t \{TXNOISE_t(i)\}$$

is a maximum transmitter referred line noise over the time period obtained and $$TXNOISE_t(i) = \frac{TXPSD(i)}{reportedSNR(i)}.$$

8. The apparatus of claim 6, wherein the transmitter referred virtual noise achieves a better balance between line stability and line data-rate and is obtained by:

$$TXREFVN(i) = \frac{SNRM_{min}}{SNRM}(TXNOISE_{mean}(i) + v \cdot TXNOISE_{std}(i)),$$

where $TXNOISE_{mean}(i)$ is a mean of the transmitter referred line noise, $TXNOISE_{std}(i)$ is a standard deviation of the transmitter referred line noise, and v is an integer multiple of standard deviations away from the mean of the transmitter referred line noise.

9. The apparatus of claim 6, wherein the transmitter referred virtual noise is adjusted to adapt to the noise condition in the subscriber line and is obtained by:

$$TXREFVN_t(i) = \begin{cases} \frac{SNRM_{min}}{SNRM} TXNOISE_t(i), \\ \text{if } \frac{SNRM_{min}}{SNRM} TXNOISE_t(i) > TXREFVN_{t-1}(i), \\ \alpha \cdot TXREFVN_t(i) + (1+\alpha) \cdot \frac{SNRM_{min}}{SNRM} TXNOISE_t(i), \\ \text{if } \frac{SNRM_{min}}{SNRM} TXNOISE_t(i) \le TXREFVN_{t-1}(i), \end{cases}$$

where $TXREFVN_t(i)$ is a first transmitter referred virtual noise for a first point in time, $TXREFVN_{t-1}(i)$ is a second transmitter referred virtual noise for a second point in time that precedes the first point in time, and $\alpha$ is a factor that determines how long a noise condition is remembered.

10. The apparatus of claim 9, wherein the factor $\alpha$ is obtained:

$$\alpha = 2^{-\frac{measurementPeriod}{\lambda}},$$

where λ is a half-life for virtual noise adaptation to the noise condition in the subscriber line and measurementPeriod is a period between line noise condition measurements.

11. The apparatus of claim 6, wherein the DSL bitloading is determined by:

$$b_i = \log_2\left(1 + \frac{1}{\Gamma}\frac{TXPSD(i)\cdot H(i)}{RXNOISE(i)\cdot SNRM_{min}}\right),$$

where SNR(i) is a signal to noise ratio (SNR) of the DSL tone i, and RXNOISE(i) is a noise level of the DSL tone.

12. The apparatus of claim 11, wherein the SNR of the DSL tone i is obtained by:

$$RXNOISE(i) = \frac{TXPSD(i)\cdot H(i)}{reportedSNR(i)},$$

where H(i) is a channel gain on the tone i.

13. A method comprising:

defining a plurality of virtual noise templates for a plurality of subscriber lines;

calculating a transmitter referred virtual noise for a tone in one of the subscriber lines based on a time history of noise conditions in the subscriber line; and selecting from the defined virtual noise templates a virtual noise template that best matches the transmitter referred virtual noise for the subscriber line, wherein the transmitter referred virtual noise is obtained by:

$$TXREFVN(i) = \frac{TXPSD(i)\cdot SNRM_{min}}{reportedSNR(i)\cdot SNRM},$$

where TXREFVN(i) is the transmitter referred virtual noise for the DSL tone i, TXPSD(i) is a transmit spectrum power density of the tone in the line, SNRM is a standard operating signal to noise ratio (SNR) margin, reportedSNR(i) is a reported SNR for the point in time, and $SNRM_{min}$ is a minimum SNR margin that is less than the standard operating SNR margin.

14. The method of claim 13, wherein the virtual noise templates are based on the severity of crosstalk and obtained by:

$$\text{VNTEMPLATE}_m(i)=g(m)\cdot K_{xf}^2\cdot f(i)^2\cdot \text{TemplatePSD}(i),$$

where $\text{VTEMPLATE}_m(i)$ is a m-th virtual noise template for the tone i, TemplatePSD(i) is a transmit power spectral density (PSD) for the tone i, f(i) is a frequency of the tone i, $K_{xf}^2$ is constant, and g(m) is a function that varies according to m and determines a magnitude of the m-th virtual noise template.

15. The method of claim 13, where the virtual noise templates are based on the severity of crosstalk and are obtained by:

$$VNTEMPLATE_{v,m}(i) = g(m)\cdot\frac{1}{H_v(i)}\cdot K_{xf}^2\cdot f(i)^2\cdot UPBOPSD(i),$$

where $\text{VTEMPLATE}_m(i)$ is a m-th virtual noise template for a v-th subscriber line, UPBOPSD(i) is an upstream power back-off (UPBO) reference PSD, f(i) is a frequency of the tone i, $K_{xf}^2$ is constant, g(m) is a function that varies according to m and determines a magnitude of the m-th virtual noise template, and $H_v(i)$ is a channel gain on the tone i for the v-th subscriber line.

16. The method of claim 13, where the virtual noise templates are based on the severity of crosstalk and are obtained by:

$$\text{VNTEMPLATE}_{v,m}(i)=g(m)\cdot K_{xf}^2\cdot f(i)^2\cdot \text{DPBOPSD}_v(i),$$

where $\text{VTEMPLATE}_m(i)$ is a m-th virtual noise template for a v-th subscriber line, DPBOPSD(i) is a downstream power back-off (DPBO) reference PSD for the v-th subscriber line, f(i) is a frequency of the tone i, $K_{xf}^2$ is constant, g(m) is a function that varies according to m and determines a magnitude of the m-th virtual noise template, $H_v(i)$ is a channel gain on the tone i for the v-th subscriber line.

17. The method of claim 13, wherein the virtual noise template that best matches the transmitter referred virtual noise from the defined virtual noise templates has a lowest power that is larger than the transmitter referred virtual noise, wherein the virtual noise template is determined by:

$$v^*, m^* = \underset{v,m}{\operatorname{argmin}}\left\{\sum_i VTEMPLATE_{v,m}(i)\right\}$$

such that $\text{TXREFVN}(i) \leqq \text{VTEMPLATE}_{v,m}(i)$, ∀i, where $\text{VTEMPLATE}_{v,m}(i)$ is a m-th virtual noise template for a v-th subscriber line, and TXREFVN(i) is the transmitter referred virtual noise for the tone i.

18. The method of claim 13, wherein the virtual noise template that best matches the transmitter referred virtual noise from the defined virtual noise templates has a best least squares fit with the transmitter referred virtual noise, wherein the virtual noise template is determined by:

$$v^*, m^* = \underset{v,m}{\operatorname{argmin}}\left\{\sum_i |TXREFVN(i) - VTEMPLATE_{v,m}(i)|^2\right\},$$

where $\text{VTEMPLATE}_{v,m}(i)$ is a m-th virtual noise template for a v-th subscriber line, and TXREFVN(i) is the transmitter referred virtual noise for the tone i.

19. The method of claim 13, wherein the virtual noise template that best matches the transmitter referred virtual noise from the defined virtual noise templates captures the transmitter referred virtual noise and achieves a highest datarate, wherein the virtual noise template is determined by:

$$v^*, m^* = \underset{v,m}{\operatorname{argmax}}\left\{\sum_i \log_2\left(1 + \frac{1}{\Gamma}\frac{TXPSD(i)}{VTEMPLATE_{v,m}(i)}\right)\right\}$$

such that $\text{TXREFVN}(i) \leqq \text{VTEMPLATE}_{v,m}(i)$, ∀i, where $\text{VTEMPLATE}_{v,m}(i)$ is a m-th virtual noise template for a v-th subscriber line, TXREFVN(i) is the transmitter referred virtual noise for the tone i, TXPSD(i) is a transmit spectrum power density of the tone i, and Γ is a signal to noise ratio (SNR) gap to capacity.

* * * * *

UNITED STATES PATENT AND TRADEMARK OFFICE

CERTIFICATE OF CORRECTION

PATENT NO. : 8,280,036 B2
APPLICATION NO. : 12/637885
DATED : October 2, 2012
INVENTOR(S) : Raphael Jean Cendrillon, Guozhu Long and Dong Wei It is certified that error appears in the above-identified patent and that said Letters Patent is hereby corrected as shown below:

Title Page: Item (74)

Attorney, Agent, or Firm: "Grant Rudolph" should read as "Grant Rodolph"

Signed and Sealed this
Fourth Day of December, 2012

David J. Kappos

David J. Kappos
*Director of the United States Patent and Trademark Office*